FLOOR PAD

Original Filed April 21, 1958

INVENTORS
CLAUDE S. ROCKABRAND
HOWARD E. HIGGINBOTHAM
BY
Brennan B. West
ATTORNEY.

United States Patent Office

Re. 26,239
Reissued July 18, 1967

26,239
FLOOR PAD

Claude S. Rockabrand, deceased, late of Oak Park, Ill., by Anna May Rockabrand, executrix, 421 S. Elmwood Ave., Oak Park, Ill. 60302, and Howard E. Higginbotham, Hillside, Ill. (309 Lakeport Ave., Addison, Ill. 60101)

Original No. 3,114,940, dated Dec. 24, 1963, Ser. No. 729,641, Apr. 21, 1958. Application for reissue Dec. 22, 1965, Ser. No. 541,040
(Filed under Rule 47(b) and 35 U.S.C. 118)
7 Claims. (Cl. 52—403)

Matter enclosed in heavy brackets [ ] appears in the original patent but forms no part of this reissue specification; matter printed in italics indicates the additions made by reissue.

This invention relates, in general, to floor constructions for buildings of different kinds, including dwellings, and it has to do particularly with resilient floor pads that are interposed between subfloors and superposed floors.

Our improved resilient floor pads are intended for attachment to the underside of sleepers that support the flooring, and the sleepers, in turn, are supported through the floor pads from a subfloor. It is obvious that superposed floors thus supported are capable of a yielding action, known as "give," and that such floors afford comfort to persons walking, running or standing thereon, as well as roller skating and dancing and minimize fatigue.

The pads may be supplied to builders separate from the sleepers, although there are advantages arising from prefabrication of the sleepers and pads by the supplier, according to preferred spacing and arrangement of the pads with respect to the sleepers.

Among the objects of our invention are: to provide a floor pad of natural or synthetic rubber or other elastic material of appropriate resiliency designed for attachment, by suitable fasteners, to the under side of sleepers, the pad including means for protecting the fasteners against being loosened or dislodged by contact with objects during the handling and shipment of prefabricated assemblies of pads and sleepers; and to provide a floor pad characterized by inwardly enlarging grooves that open through the planar under surface of the body portion of the pad and are defined along their open sides by relatively sharp undercut edges, the material of the body portion on opposite sides of each groove constituting ribs of relatively narrow cross section in a zone spaced a distance inwardly from the open sides of the grooves, this feature contributing to a desirable action when the pad is subjected to compressive forces in a substantially vertical direction or to shearing forces in a generally horizontal direction.

Another object is to provide a floor pad that readily lends itself to economical production, in different sizes, by the extrusion of strips of material of appropriate cross sectional size and shape and severing the strips into pieces of required width to produce pads of the desired size.

By reason of the shape of the grooves and ribs above described, the pad not only reacts to forces imposed thereon in a manner to insure proper resilient action or "give" to the floor, but a bearing surface is produced for contact with the subfloor which performs in the fashion of a well defined and efficient tire tread for minimizing creeping of the pad on the subfloor during expansion and contraction of the superposed floor, brought about by atmospheric and temperature changes.

The objects above set forth, with others that will appear as this description proceeds, are attained in the embodiments of the invention illustrated in the accompanying drawing wherein—

Figure 1:
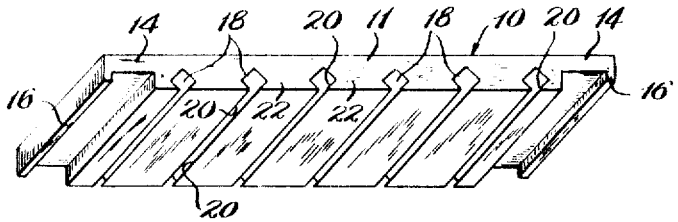
FIGURE 1 is a perspective view of one form of our improved floor pad, revealing the grooved underneath side thereof.

The pad shown in FIGURE 1, and designated generally by the reference numeral 10, consists of a flat body portion 11, having substantially parallel top and bottom surfaces. The body portion is rectangular, and extending from the opposite ends thereof are relatively thick attaching flanges 14. The top surfaces of the flanges 14 are flush with the corresponding surface of the pad, and lips 16 depend from the edges of the flanges 14 remote from the body portion, for a purpose presently to be explained. Grooves 18 open through the bottom surface of the body portion 11 and adjacent said surface their opposed sides are upwardly divergent so as to produce relatively sharp edges 20 along the opposite sides of the grooves. In the present instance, the grooves 18 are substantially square in cross section and are disposed as though one diagonal axis of the square is vertical, and the other horizontal.

It follows from the foregoing that ribs 22 extend along the opposite sides of each groove and, by reason of the shape of the grooves, the ribs are reduced in breadth in the plane of the widest parts of the grooves.

Figure 3:
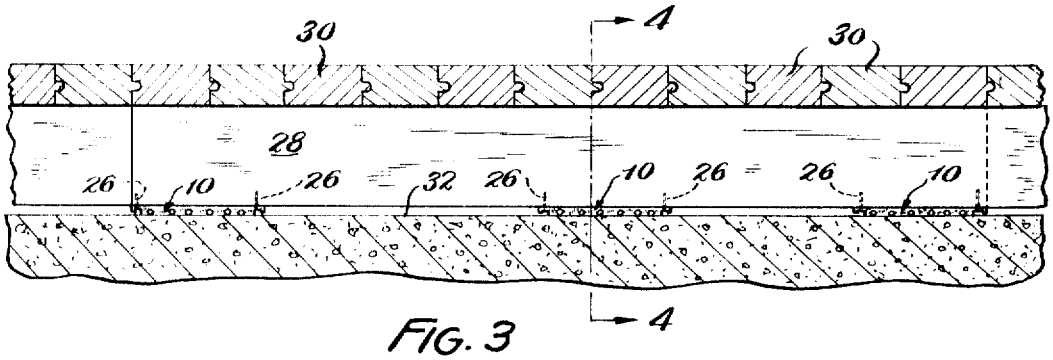
FIGURE 3 is a sectional detail of a floor construction incorporating the pads.
Figure 4:
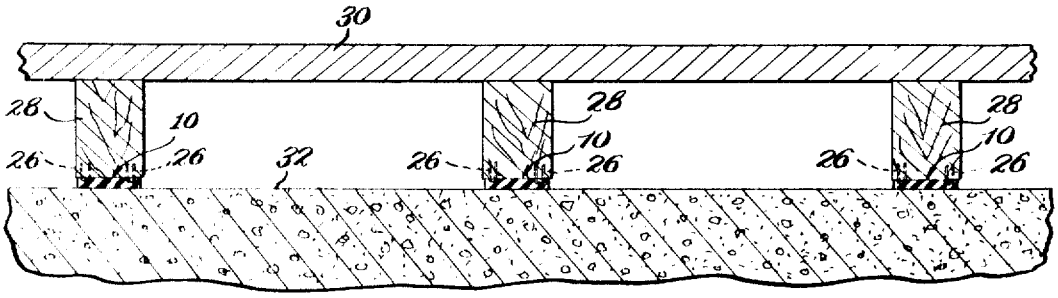
FIGURE 4 is a section on the line 4—4 of FIGURE 3.

As illustrated in FIGURES 3 and 4, the pads 10 are secured, by fastening means or staples 26, to the underside of sleepers 28 that carry a floor 30. The boards of which the floor is formed are secured to the sleepers in the usual way. Obviously, the floor may be double, if desired, in accordance with conventional practice. The floor construction just described is resiliently supported, through the pads 10, from a subfloor 32. The subfloor may be of any suitable construction and material, the one shown in the drawing being indicated as consisting of a cement slab.

In practice, sleepers of convenient length—four feet, for example—may be supplied to builders with the floor pads secured thereto by the fastening means or staples 26. The lips 16, that extend along the outer edges of the attaching flanges 14, effectively protect the fastening means or staples 26 from contact with objects during handling and shipment of the prefabricated assemblies of sleepers and pads, and which might cause the fastening means to be loosened or dislodged.

It is evident that the pads 10 resiliently support the superposed floor structure, but it will be understood that the composition of the pads is stiff and firm enough to prevent noticeable descent of the floor structure under its own weight. In this connection it may be explained that the desired spacing apart of the pads is approximately twelve inches in both directions of the floor structure. To avoid relative vertical movement between adjoining aligned sleepers, the joints of one row of sleepers are offset or staggered with respect to the joints of adjacent rows.

When weight or sudden impact is imposed upon the floor in a vertical direction, the ribs 22 of the body portions of the pads will yield in a vertical direction, and when a lateral thrust is imparted to the floor a stress in a substantially horizontal direction will be transmitted to the pads and under these circumstances the ribs will be deformed laterally to a very slight degree. Due to the fact that the ribs are reduced in breadth a distance upwardly from the bottom surface of the pads, they will yield more readily to this latter action.

As hereinbefore pointed out, the grooved bottom surface of the pad functions in the manner of an efficient tire tread, the action being enhanced by the sharp edges 20, and as a result, shifting of the pad on the subfloor during expansion and contraction of the superposed floor structure is minimized.

Figure 2:
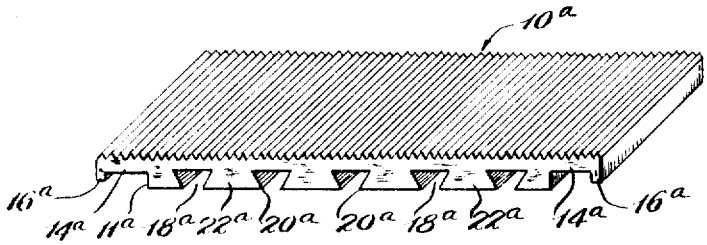
FIGURE 2 is a perspective view of another form of the pad, showing the corrugated top side thereof.

In the modified form of the pad illustrated in FIGURE 2, the grooves 18a are of dovetail shape in cross section. Hence, the sides of the grooves diverge upwardly, producing the sharp edges 20a, and they join the horizontal top walls of the groove at an acute angle. The intermediate ribs 22a are of minimum breadth in the plane of said top walls, which condition enhances the action of the pad especially when subjected to stresses in a lateral direction. The top surface of the pad is shown as made up of parallel transverse ribs, which tends to overcome, to a considerable extent, any tendency of the pad to shift with respect to the sleeper to which it is secured. Furthermore, a pad of the present design effects a saving in rubber over a pad of the design and proportions of the one first described, the V-shaped channels that set off the ribs of the top wall being within the maximum thickness of the earlier described pad; and since the grooves 20a are of greater cross sectional area than those of the first described form, less rubber is contained in the body portion 11a of the pad 10a.

The pads are cut from extrusions of natural or synthetic rubber or other suitable elastic material having a cross section that corresponds to the shape of the pad when viewed from the side. Therefore, different size pads differ in width only and the width is determined by the loads and stresses to which the pads are expected to be subjected. Obviously, smaller pads are used in floors of dwellings than are employed in the floors of commercial or industrial buildings or gymnasiums. Accordingly, from the same extrusion, heavy duty and light duty pads may be produced simply by cutting them to appropriate width.

Having thus described our invention, what we claim is:

1. A floor pad composed of a rectangular integral piece of resilient material and comprising a flat body portion having top and bottom surfaces lying in substantially parallel planes and being of reduced thickness at its ends to provide integral attaching flanges that are of uniform width throughout their length and are flush on their upper sides with the top surface of the body portion, an integral lip extending along and depending from the edge of each flange remote from the body portion and being of a depth within the thickness of said portion, the body portion having a series of relatively deep hollow grooves parallel to its ends that are open at their ends and also through its bottom surface, and ribs on opposite sides of each groove, the sides of the grooves diverging upwardly from the bottom surfaces at a relatively wide angle thereby to produce comparatively sharp edges along the opposite sides of the grooves and reduce in lateral dimension the aforesaid ribs a distance upwardly from said bottom surface.

2. A floor pad as set forth in claim 1 wherein the sides of said grooves reconverge upwardly above the point where said ribs are of minimum width whereby the grooves have a substantially square section with the diagonal of the square arranged vertically.

3. A floor pad as set forth in claim 1 wherein the grooves have a generally dovetail shaped cross section.

*4. In a floor construction including a subfloor and a superimposed floor, an intermediate floor pad composed of a rectangular integral piece of resilient material and comprising a flat body portion having top and bottom surfaces lying in substantially parallel planes and being of reduced thickness at its ends to provide integral attaching flanges that are of uniform width throughout their length and are flush on their upper sides with the top surface of the body portion, the body portion having a series of relatively deep hollow grooves parallel to its ends that are open at their ends and also through its bottom surface, and ribs on opposite sides of each groove, the bottom surface of said ribs constituting gripping surfaces defined by edges, the sides of the grooves diverging upwardly from the bottom surface at a relatively wide angle thereby reducing in lateral dimension the aforesaid ribs a distance upwardly from said bottom surface, and fasteners extending through said attaching flanges and connecting said floor pad to the superimposed floor with said top surface in contact therewith, said gripping surface of each rib being deformable to conform to any irregularities in said subfloor and frictionally grip said subfloor thereby resisting relative horizontal movement between each gripping surface and said subfloor.*

*5. In a floor construction including a subfloor and a superimposed floor, an intermediate floor pad composed of a rectangular integral piece of resilient material and comprising a flat body portion having top and bottom surfaces lying in substantially parallel planes and being of reduced thickness at its ends to provide integral attaching flanges that are of uniform width throughout their length and are flush on their upper sides with the top surface of said body portion, the body portion having a series of relatively deep hollow grooves parallel to its ends that are open at their ends and also through its bottom surface, and ribs on opposite sides of each groove, the sides of the grooves diverging upwardly from the bottom surface at a relatively wide angle thereby reducing in lateral dimension the aforesaid ribs a distance upwardly from said bottom surface, and means securing said floor pad to said superimposed floor with said top surface in abutting contact therewith, the bottom surface of each rib constituting a deformable gripping surface defined by edges which frictionally grip said subfloor.*

*6. In a floor construction comprising a subfloor and a superimposed floor, an intermediate floor pad comprising a rectangular unitary member of resilient material having substantially parallel top and bottom surfaces, said top surface being in abutting contact with said superimposed floor, and said bottom surface frictionally gripping said subfloor, said bottom surface having a plurality of parallel hollow grooves extending the full width of the pad and open at the ends thereof, said grooves being at least substantially one half the thickness of the pad in depth, said grooves by their side walls defining a plurality of parallel gripping ribs each having a gripping surface forming part of said bottom surface, said ribs having greater width than the grooves at said gripping surface, said side walls of the grooves being laterally diverging upward from said gripping surface, said diverging walls reducing the lateral thickness of the ribs intermediate said top and bottom surfaces to provide increased resiliency of said ribs under applied loads.*

*7. In a floor construction comprising a subfloor and a superimposed floor, an intermediate floor pad comprising a rectangular unitary member of resilient material having substantially parallel top and bottom surfaces, said top surface being in abutting contact with said superimposed floor, said bottom surface gripping frictionally said subfloor, said bottom gripping surface having a plurality of parallel hollow grooves extending the full width of the pad and open at the ends thereof, said grooves by their side walls defining a series of parallel gripping ribs comprising the bottom surface, said ribs having greater width than the grooves at said gripping surface, said side walls of the grooves being laterally diverging upward from said bottom gripping surface, said grooves being at least one half the thickness of the pad in depth, said diverging walls reducing laterally the thickness of the ribs intermediate*

*said top and bottom surfaces and allowing increased resiliency of said ribs increasing their gripping action, and adjacent the outermost rib on both sides a flange of uniform width throughout and having a top surface coextensive with said top surface of the pad.*

References Cited

The following references, cited by the Examiner, are of record in the patented file of this patent or the original patent.

UNITED STATES PATENTS

| | | | |
|---|---|---|---|
| 1,280,363 | 10/1919 | Anderson | 94—15 X |
| 1,572,854 | 2/1926 | Clark et al. | 94—15 |
| 1,628,090 | 5/1927 | Weiss. | |
| 1,629,433 | 5/1927 | Bonner et al. | 94—15 |
| 1,661,037 | 2/1928 | Gammeter | 94—1.5 X |
| 1,846,255 | 2/1932 | Harding | 248—22 |
| 2,337,525 | 12/1943 | Peik | 52—145 X |
| 2,546,394 | 3/1951 | Harmon | 248—22 X |
| 2,579,467 | 12/1951 | Brickman | 94—15 X |
| 2,860,384 | 11/1958 | Wait et al. | 52—403 X |
| 2,862,255 | 12/1958 | Nelson | 52—403 |

FOREIGN PATENTS

| | | |
|---|---|---|
| 399,647 | 10/1933 | Great Britain. |
| 55,455 | 1938 | Denmark. |
| 550,074 | 12/1942 | Great Britain. |
| 805,281 | 5/1951 | Germany. |
| 72,951 | 8/1951 | Denmark. |

OTHER REFERENCES

The Engineer, page 503 (Br. #678,731), Oct. 10, 1952.

JOHN E. MURTAGH, *Primary Examiner.*